US010313445B2

(12) United States Patent
Østergaard et al.

(10) Patent No.: US 10,313,445 B2
(45) Date of Patent: Jun. 4, 2019

(54) SENSOR DEVICE FOR A BICYCLE (71) Applicant: Rolf Østergaard ApS, København Ø (DK)

(72) Inventors: Rolf V. Østergaard, København Ø (DK); Morten Kristiansen, Allerød (DK)

(73) Assignee: ROLF ØSTERGAARD APS, KØBENHAVN Ø (DK)

( * ) Notice: Subject to any disclaimer, the term of this patent is extended or adjusted under 35 U.S.C. 154(b) by 0 days.

(21) Appl. No.: 15/642,521

(22) Filed: Jul. 6, 2017

(65) Prior Publication Data

US 2018/0013833 A1 Jan. 11, 2018

(30) Foreign Application Priority Data

Jul. 7, 2016 (DK) .................................. 2016 70509

(51) Int. Cl.
*B62J 99/00* (2009.01)
*H04L 29/08* (2006.01)

(52) U.S. Cl.
CPC .............. *H04L 67/12* (2013.01); *B62J 99/00* (2013.01); *B62J 2099/002* (2013.01); *B62J 2099/0013* (2013.01)

(58) Field of Classification Search
CPC .......................... B62J 99/00; B62J 2099/0013
USPC ......................................................... 702/188
See application file for complete search history.

(56) References Cited

U.S. PATENT DOCUMENTS 9,097,598 B2 8/2015 Grassi
2011/0136627 A1 6/2011 Williams
2012/0330572 A1* 12/2012 Longman ................. G01L 3/247
702/44
2015/0306458 A1* 10/2015 Watarai .............. A63B 24/0062
340/432
2015/0311953 A1* 10/2015 Kanamaru ........... G01C 22/002
455/41.1
2015/0355042 A1* 12/2015 Kodama .................. G01L 1/22
73/862.045
2015/0360740 A1* 12/2015 Sarvestani ............... B62J 99/00
280/281.1
2016/0039496 A1* 2/2016 Hancock ................. G01S 19/19
701/60
2016/0046339 A1* 2/2016 Chen ......................... B62J 1/08
73/760
2016/0144915 A1* 5/2016 Bejestan .................. B62J 99/00
340/432
2016/0221627 A1* 8/2016 Hines ....................... B62H 5/20
2016/0311491 A1* 10/2016 Watarai ................... B60L 15/20

(Continued)

*Primary Examiner* — Stephanie E Bloss
(74) *Attorney, Agent, or Firm* — Holland & Hart LLP (57) ABSTRACT A bicycle sensor device of the type not having Internet accessibility and comprising at least one sensor element adapted for registering data regarding the bicycle, a data storage unit adapted for storing registered data regarding the bicycle, a processor element adapted for generating an output of the sensor device, and a transmitter element adapted for transmitting by short range communication an output of the sensor device to an external device being adapted for displaying the output of the sensor device to a user. The processor element is configured to cause the transmitter element to transmit the output of the sensor device to an external device in one of a first mode, a second mode and a third mode. The first mode is a normal operation mode, the second mode is a service request mode, and the third mode is a data transfer mode.

18 Claims, 8 Drawing Sheets (56) References Cited

U.S. PATENT DOCUMENTS

| | | |
|---|---|---|
| 2016/0314670 A1 | 10/2016 | Roberts et al. |
| 2017/0048445 A1* | 2/2017 | Li ........................ H04N 5/23203 |
| 2017/0106866 A1* | 4/2017 | Schieffelin ............. B62M 9/122 |
| 2017/0189785 A1* | 7/2017 | Chen ................... A63B 71/0054 |
| 2017/0191825 A1* | 7/2017 | Terao ..................... G01B 21/22 |
| 2017/0225742 A1* | 8/2017 | Hancock .................. B62M 6/45 |
| 2017/0364995 A1* | 12/2017 | Yan ..................... B60L 11/1825 |

* cited by examiner

SENSOR DEVICE FOR A BICYCLE

FIELD OF THE INVENTION

The present invention generally relates to bicycle sensors, such as power sensors or other types of sensors used for bicycles. The present invention more specifically relates to a bicycle sensor device of the type not having internet accessibility and being mounted on or built into a component of a bicycle, the sensor device comprising at least one sensor element adapted for registering data regarding the bicycle, a data storage unit adapted for storing registered data regarding the bicycle, a processor element adapted for generating an output of the sensor device, and a transmitter element adapted for transmitting by short range communication an output of the sensor device to an external device being adapted for displaying the output of the sensor device to a user.

As used herein, the word "bicycle" is intended to encompass any type of bicycle, including but not limited to racing bicycles, mountain bikes, city bicycles and indoor or outdoor training bikes.

As used herein the word "external device" is intended to refer both to mobile and/or portable, de-central computer devices such as mobile telephones, tablets, smart watches, laptops, stationary or mobile access points and the like, all being equipped with internet access, but not serving as a central server unit and to mobile and/or portable, de-central computer devices such as bicycle computers and the like, not being equipped with internet access, and not serving as a central server unit.

As used herein the term "short range communication" is intended to refer to electronic communication over short ranges, typically less than 100 meter, and to encompass, but not be limited to, solutions as for instance Bluetooth, WIFI, ANT and the like.

As used herein the term "data pattern" is intended to mean data which when displayed to a user is readily discernible to the user as comprising a regular and intelligible form or sequence.

BACKGROUND OF THE INVENTION

There is a growing interest among bicycle athletes, particularly professionals and serious amateurs, to gather more data about the rides. Both for the purpose of improving the athletes performance and for improving the handling and characteristics of the bicycle. Increasing numbers of sensors are used to measure a number of different parameters.

Constant focus on reducing the weight of the bicycle, leads to more fragile bicycle parts which must be maintained and supervised to keep the bicycle safe. Weight issues also lead to the provision of an internet connection in the sensor itself not being a feasible solution since a result would be that the sensor would have an excessively high consumption of electrical energy and thus require the provision of a battery being both large and heavy. This would be completely unacceptable to especially professional bicycle athletes.

It is, however, still desirable to use at least some of a plurality of sensors arranged on a bicycle to provide data that can be used to help the user perform maintenance before a safety critical situation occurs.

Many known sensors are therefore battery driven and designed for low cost and thus equipped with only short range communication such as to keep the battery weight and size as low as possible. These sensors cannot directly communicate with a remote server, as that would usually require access to the internet. Instead, a smartphone, PC, tablet, access point or other connected device may be used to bridge the data by connecting to the sensor and to the internet. A suitable application, such as Endomondo®, installed on the connected device may be used for easy access to the data on the connected device.

However, a remaining problem, especially when monitoring bicycle parts for wear to ensure timely maintenance of the bicycle, is that the user may in many circumstances not pay attention to or remember to perform a data transfer via a bridging external device in a timely manner and/or sufficiently frequently, thereby in effect making remote monitoring impossible. This will inhibit a remote monitoring scheme, which could be used to issue warnings about required maintenance or other usage instructions.

SUMMARY OF THE INVENTION

It is therefore an object of the invention to provide a sensor device with a mechanism ensuring that the user in fact does perform a data transfer via a bridging external device in a timely manner and/or sufficiently frequently, thereby making remote monitoring possible.

According to the invention this and other objects are achieved by means of a bicycle sensor device of the type not having internet accessibility and being adapted for being mounted on or built into a component of a bicycle, the sensor device comprising at least one sensor element adapted for registering data regarding the bicycle, a data storage unit adapted for storing registered data regarding the bicycle, a processor element configured to generate an output of the sensor device, and a transmitter element adapted for transmitting by short range communication an output of the sensor device to an external device being adapted for displaying the output of the sensor device to a user, where the processor element is configured to cause the transmitter element to transmit the output of the sensor device to an external device in one of a first mode, a second mode and a third mode, and where the first mode is a normal operation mode in which the output of the sensor device generated by the processor element is the registered data regarding the bicycle, the second mode is a service request mode in which the output of the sensor device generated by the processor element comprises data, which data, when the output of the sensor device is displayed to the user, is readily discernible to the user as differing from the registered data regarding the bicycle, and the third mode is a data transfer mode in which data stored in the data storage unit of the sensor device, such as the registered data regarding the bicycle, is transferred to the external device or to a further external device, and if required furthermore is uploaded to a remote server unit via the external device or the further external device.

By providing the sensor device with a processor element being configured to cause the transmitter element to transmit the output of the sensor device to an external device in one of a first mode, a second mode and a third mode, the second mode being a service request mode in which the output of the sensor device generated by the processor element is the registered data regarding the bicycle modified to comprise a data pattern signalling anomalous operation of the sensor device, the output of the sensor device in the second mode as observed by the user on an external device may be brought to change in such a way that the user will note the data pattern signalling anomalous operation of the sensor device as it prevents the user from properly tracking the actual parameters measured. Thereby, the data pattern signalling anomalous operation of the sensor device reminds the user to connect the sensor device to the internet, in order to restore normal operation.

Thus, a sensor device with a mechanism ensuring that the user in fact does perform a data transfer via a bridging external device in a timely manner and/or sufficiently frequently is provided for. Such a sensor device makes remote monitoring of the bicycle on which it is mounted possible. Such a sensor device furthermore enables issuing warnings about required maintenance or other usage instructions.

In an embodiment the processor element furthermore is configured to, when the transmitter element transmits the output of the sensor device to the external device or the further external device in the second mode, only to cause the transmitter element to return to transmit the output of the sensor device to the external device in the first mode via the third mode.

Thereby, the data pattern signalling anomalous operation of the sensor device in effect forces the user to connect the sensor device to the internet in order to restore normal operation. Such a sensor device makes a particularly well functioning remote monitoring of the bicycle on which it is mounted possible in that it ensures that data is uploaded to the remote server every time the sensor device operates in the second mode.

In an embodiment the processor element furthermore is configured to perform a transition from causing the transmitter element to transmit the output of the sensor device in the first mode to causing the transmitter element to transmit the output of the sensor device in the second mode in reaction to a predefined limit of a predefined value being reached.

Such a sensor device makes a particularly well functioning remote monitoring of the bicycle on which it is mounted possible in that it ensures that data is uploaded to the remote server regularly, for instance with predetermined intervals.

It is noted that the predefined limit and/or the predefined value may be predefined both for a batch of sensor devices, for each sensor device individually or may even for each sensor device individually be predefined several times during the lifetime of a sensor device, for instance each time a given sensor device is returning to operating in the first mode. Predefining the predefined limit and/or predefined value in a more individualized manner for a given sensor device has the advantage of providing a higher degree of freedom in scheduling the next transition of the sensor device to operating in the second mode, and thus the next transfer of data. Thereby the life time of the bicycle component monitored may also be optimized.

In an embodiment the predefined value is chosen from the group comprising: usage time, number of rides, number of revolutions, magnitude of vibrations, magnitude of strain and magnitude of stress.

Predefined values such as magnitude of vibrations are advantageous for monitoring wear of bicycle parts such as, but not limited to, cranks, wheels and wheel rims. Predefined values such as usage time, number of rides and number of revolutions are advantageous for monitoring wear of parts such as, but not limited to, tires and brakes. Predefined values such as magnitude of strain and stress are advantageous for monitoring wear of bicycle parts such as, but not limited to, cables and frame components and chains.

In an embodiment the second mode is a service request mode in which the output of the sensor device generated by the processor element comprises data being the registered data regarding the bicycle modified to comprise a data pattern, which data pattern, when the output of the sensor device is displayed to the user, is readily discernible to the user as differing from the registered data regarding the bicycle.

Thereby a sensor device is provided with a mechanism ensuring that the user in fact does perform a data transfer via a bridging external device in a timely manner and/or sufficiently frequently is provided for, even in the case the external device is solely configured for displaying parameters derivable from the registered data regarding the bicycle. This would e.g. be the case for many known types of bicycle computers.

In an embodiment the sensor device further comprises a receiver element adapted for receiving an input from the external device and/or from or the further external device, and the processor element is configured to perform a transition from causing the transmitter element to transmit the output of the sensor device in the second mode to causing the transmitter element to transmit the output of the sensor device in the third mode in reaction to the input received indicating that an internet connection is established via the external device or the further external device and/or the input received indicating a request for data transfer from the external device or the further external device.

Thereby a sensor device with automatic initiation of the uploading process taking place in the third mode is obtained.

In an embodiment the processor element is configured to perform a transition from causing the transmitter element to transmit the output of the sensor device in the third mode to causing the transmitter element to transmit the output of the sensor device in the first mode in reaction to the data storage unit being empty.

Thereby it is ensured that a full upload of the available data is always achieved, such that an optimum amount of data is available for the remote monitoring of the bicycle.

In an embodiment the sensor device further comprises a receiver element adapted for receiving an input from the external device and/or from the further external device and/or from the remote server unit, and wherein the processor element is configured to perform a transition from causing the transmitter element to transmit the output of the sensor device in the third mode to causing the transmitter element to transmit the output of the sensor device in the first mode in reaction to the input received indicating that the data transfer is completed, and/or in reaction to the input received indicating that the data in the data storage unit and the data in the external device or in the further external device or in the remote server unit is synchronized, and/or in reaction to the input received comprising a key or token configured to cause the processor element to switch to the first mode for any one of a defined and an infinite period of time.

In any event automatic restoration to operation in the first mode of the sensor device is also obtained.

Performing the transition from the third mode to the first mode in reaction to the input received indicating that the data transfer is completed has the advantage that a full upload of the available data is always achieved, such that an optimum amount of data is available for the remote monitoring of the bicycle.

Performing the transition from the third mode to the first mode in reaction to the input received indicating that synchronization of data is obtained has the advantage that a full synchronization of the available data is always achieved, such that an optimum amount of data is available for the remote monitoring of the bicycle.

Performing the transition from the third mode to the first mode in reaction to the input received comprising a key or token configured to cause the processor element to switch to the first mode for a defined period of time has the advantage of enabling the user of either of the external device and the remote server to define when the next upload process is to take place. Thereby even more thorough remote monitoring of the bicycle on which the sensor device is mounted may be obtained.

Performing the transition from the third mode to the first mode in reaction to the input received comprising a key or token configured to cause the processor element to switch to the first mode for a defined period of time has the advantage of providing a simple and straight forward method of initially installing and testing the sensor device.

The data pattern signalling anomalous operation of the sensor device may comprise any one of the following:

alternating an output of the sensor device corresponding to the output of the sensor device in the first mode for a first predetermined duration and an output of the sensor device not corresponding to the output of the sensor device in the first mode, for instance a null value output, for a second predetermined duration, an output of the sensor device corresponding to the output of the sensor device in the first mode for a first parameter displayed to a user and an output of the sensor device not corresponding to the output of the sensor device in the first mode, for instance a null value output, for a second parameter displayed to the user, alternating different values of a first parameter displayed to a user, and a constant value of a first parameter displayed continuously to a user.

In an embodiment the sensor device further comprises a connection element adapted for mounting of the sensor device on a component of a bicycle. Thereby easy and simple mounting of the sensor device is provided for, and the sensor device may also be mounted by the end user of the bicycle.

In another embodiment the sensor device is built into a component of a bicycle. Thereby easy and simple mounting of the sensor device during production of the bicycle is provided for. Furthermore, it is ensured that the sensor device is also available when exchanging the bicycle part, into which the sensor device is built. Also, it may be achieved that the sensor device is protected from external, e.g. weather inflicted, influences. Finally, such a sensor device is lighter in weight as compared to a version with a mounting element.

In a second aspect the above and other objects are achieved by means of a system comprising a sensor device according to any one of the above claims and an external device, wherein the sensor device comprises a transmitter element and a processor element, the processor element being configured to generate an output of the sensor device and to cause the transmitter element to transmit the output of the sensor device to the external device in one of a first mode, a second mode and a third mode, wherein the first mode is a normal operation mode in which the output of the sensor device generated by the processor element is the registered data regarding the bicycle, the second mode is a service request mode in which the output of the sensor device generated by the processor element comprises data, which data, when the output of the sensor device is displayed to the user, is readily discernible to the user as differing from the registered data regarding the bicycle, and the third mode is a data transfer mode in which data stored in the data storage unit of the sensor device, such as the registered data regarding the bicycle, is transferred to the external device, and if required furthermore is uploaded to a remote server unit via the external device, and wherein the external device is configured to and adapted for receiving the transmitted output of the sensor device, displaying the received output of the sensor device to a user, providing a connection to the internet and, if required, when the processor element is causing the transmitter element to transmit the output of the sensor device to the external device in the third mode, uploading the received output of the sensor device to a remote server unit via the connection to the internet.

In a variant of the second aspect the above and other objects are achieved by means of a system where the external device is only configured to and adapted for receiving the transmitted output of the sensor device and displaying the received output of the sensor device to a user, the system further comprises a further external device, the third mode is a data transfer mode in which data stored in the data storage unit of the sensor device, such as the registered data regarding the bicycle, is transferred to the further external device, and if required furthermore is uploaded to a remote server unit via the further external device, and the further external device is configured to and adapted for receiving the transmitted output of the sensor device, displaying the received output of the sensor device to a user, providing a connection to the internet and, if required, when the processor element is causing the transmitter element to transmit the output of the sensor device to the further external device in the third mode, uploading the received output of the sensor device to a remote server unit via the connection to the internet.

In an embodiment of the system according to the second aspect of the invention the external device and/or the further external device and/or the remote server unit is furthermore configured to transmit an input to the sensor device, and the sensor device further comprises a receiver element adapted for receiving the input from the external device and/or the further external device and/or the remote server unit.

The external device of the system may furthermore comprise an app or the like enabling use of the data transferred from the sensor device for statistical, marketing related or trade related purposes.

Hence, an exploitation of data may be that an analysis is taking place either in the external device or in the remote server unit, and when the analysis reveals that a component of the bicycle is worn and needs maintenance or replacement, the app or the external device may be configured to inform the user correspondingly.

Likewise, the app or the external device or even the remote server unit may be configured to perform statistical analysis on the data, and for presenting the result of the statistical analysis to the user.

BRIEF DESCRIPTION OF THE DRAWINGS

The invention will be described in more detail below by means of a non-limiting example of a presently preferred embodiment and with reference to the schematic drawings, in which.

DETAILED DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person.

Figure 1:
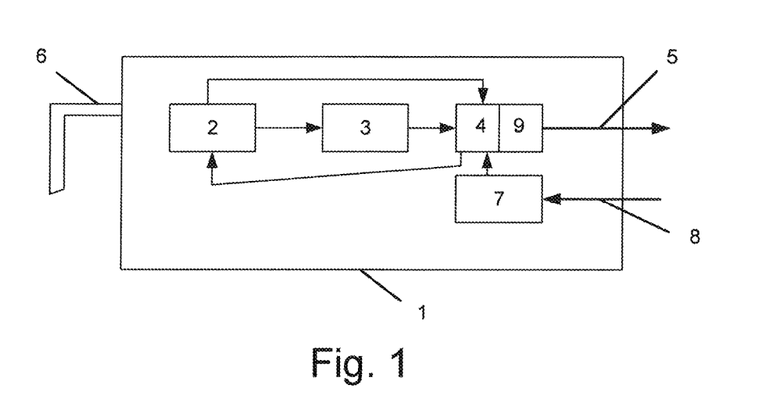
FIG. 1 shows a schematic illustration of a sensor device according to the first aspect of the invention.

Referring first to FIG. 1, a bicycle sensor device 1 of the type not having internet accessibility and being adapted for being mounted on a component of a bicycle 100 (cf. FIG. 7) is shown. To this end the sensor device 1 comprises a suitable connection element 6, such as, but not limited to, a snap-locking element, a clamping element, a magnetic element and an element adapted for being locked by means of a screw or bolt.

Alternatively, the connection element 6 may be omitted and the sensor device 1 may be built into a component of a bicycle 100.

Figure 7:
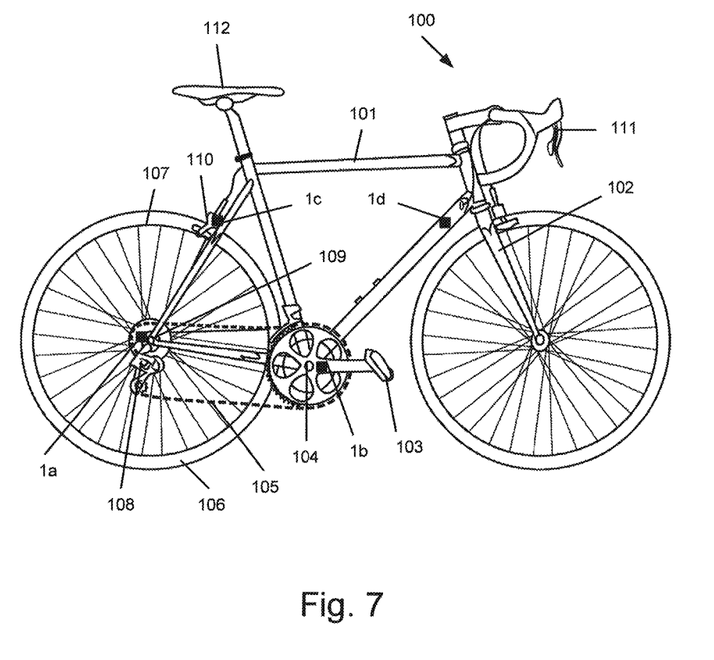
FIG. 7 shows a schematic illustration of a bicycle on which a number of sensor devices according to the invention are mounted.

FIG. 7 illustrates a bicycle 100 on which a number of schematically indicated bicycle sensor devices 1a, 1b, 1c, 1d are mounted on various components of the bicycle by being built in or by means of a connection element 6 adapted for mounting of the sensor device 1a, 1b, 1c, 1d on a component of the bicycle 100. Thus, in either case the component of the bicycle 100 on which the sensor device 1a, 1b, 1c, 1d is mounted may be any component, such as but not limited to a hub 109, a rear derailleur 108, a wheel 107, a tyre 106, a chain 105, a crank set 104, a foot pedal 103, a frame 101, particularly a fork 102 of a frame 101, and a brake 110. Other possible components are a handle 111, a saddle 112 and a suspension typically built into the fork 102 of the frame 101 of the bicycle 100.

Referring again to FIG. 1, the sensor device 1 further, and irrespective of the embodiment, comprises a sensor element 2, a data storage unit 3, a processor element 4 and a transmitter element 9. The sensor element 2 is adapted for registering data regarding the bicycle 100. The data storage unit 3 is adapted for storing data regarding the bicycle 100 registered by the sensor element 2. The transmitter element 9 is adapted for transmitting an output 5 of the sensor device 1 to an external device 50 (cf. FIG. 5). The external device 50 is adapted for displaying the output 5 of the sensor device 1 to a user, particularly by comprising a display 51, cf. also FIGS. 2-5. The processor element 4 and/or the transmitter element 9 and/or the data storage unit 3 may be parts of the same component, e.g. a chip, or may be separate components.

The processor element 4 of the sensor device 1 is configured to generate an output 5 of the sensor device 1, the output 5 comprising the data registered by the sensor element 2. The processor element 4 is furthermore configured to cause the transmitter element 9 to transmit the output 5 to the external device 50 in one of a first mode M1, a second mode M2 and a third mode M3. The three modes M1, M2, M3 and the transitions TA, TB and TC between the modes are illustrated schematically in FIG. 2 and will be described in the following.

Figure 9:
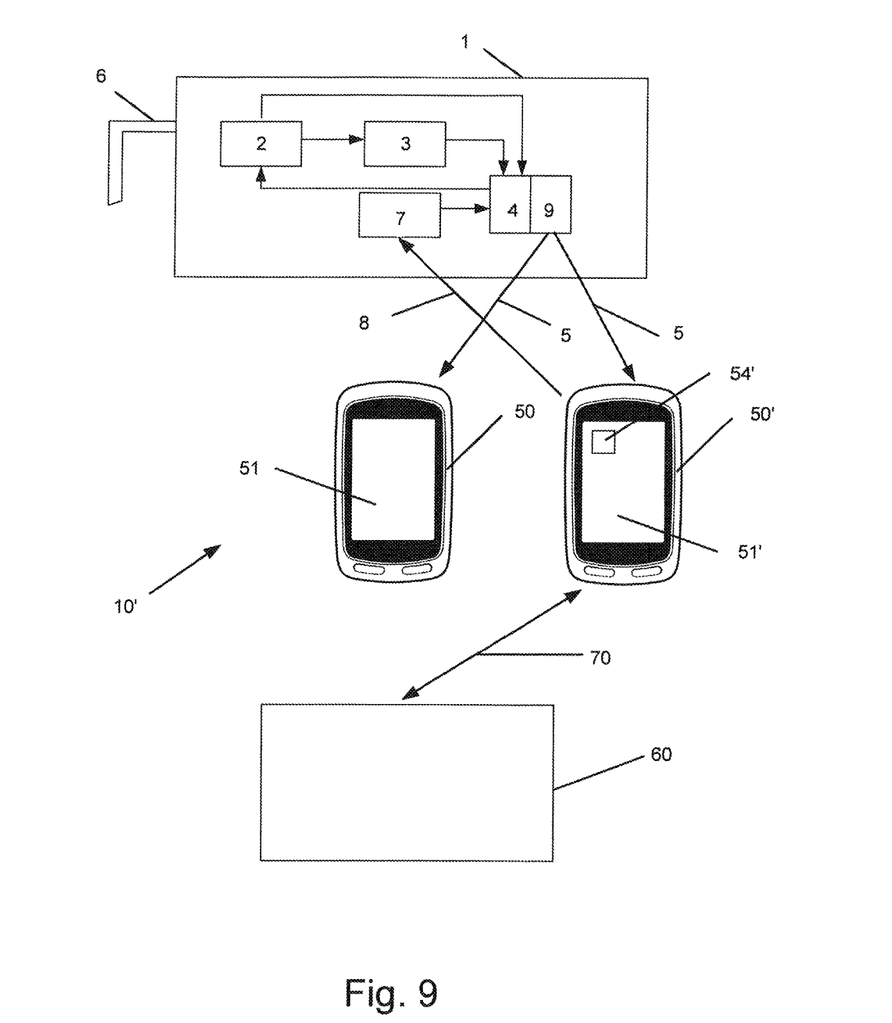
FIG. 9 shows a schematic illustration of another system according to a second aspect of the invention and comprising a sensor device according to the first aspect of the invention, an external device and a further external device.

Optionally, the sensor device 1 may also comprise a receiver element 7 adapted for receiving an input 8 from the external device 50 and/or from a further external device 50' (cf. FIG. 9).

Figure 2:
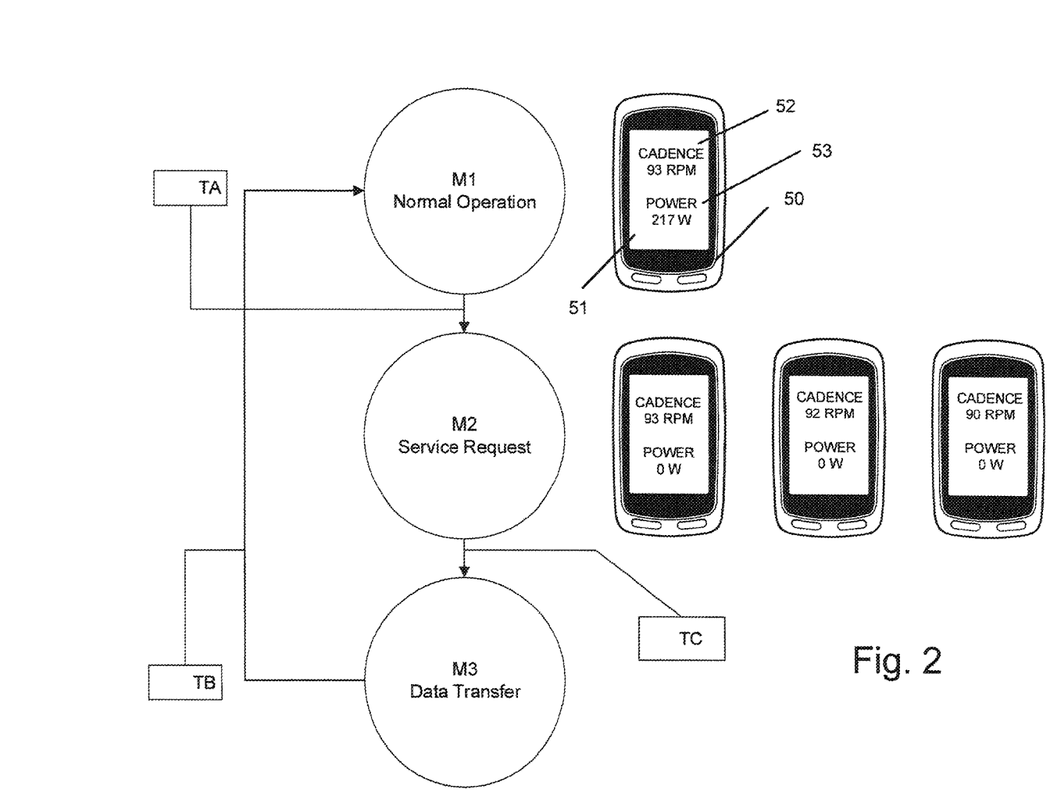
FIG. 2 shows a schematic illustration of the operation modes and transitions between the operation modes of a sensor device according to the invention and FIG. 1.

The first mode M1 is a mode of normal operation in which the output 5 of the sensor device 1 is the actual registered data regarding the bicycle 100. When the sensor device 1 operates in the first mode M1, the external device 50 thus displays the actual registered data regarding the bicycle 100 to the user. The first mode M1 may be set or preset to last for a pre-defined period of real time or time of operation, number of rides, revolutions or whatever metric the manufacturer may choose as the limiting factor, upon which the sensor device automatically starts operating in the second mode M2. In other words the transition between operation in the first mode M1 and the second mode M2 is performed in reaction to a predefined limit of a predefined value being reached.

The second mode M2 is a service request mode in which the output 5 of the sensor device 1 comprises data, e.g. in the form of a data pattern, which when the output of the sensor device is displayed to the user, is readily discernible to the user as being different from the actual registered data regarding the bicycle, and which thus signals anomalous operation of the sensor device 1. When the sensor device 1 operates in the second mode M2, the external device 50 thus displays a modified version of the registered data regarding the bicycle 100 to the user. The registered data regarding the bicycle 100 is modified in such way that it is obvious to the user that the data displayed by the external device 50 is wrong or differs from what would have been shown during operation of the sensor device 1 in the first mode M1, and is in other words not the actual registered data regarding the bicycle 100.

Alternatively, such an output of the sensor device 1 may in principle simply be a data pattern, which when the output of the sensor device is displayed to the user, is readily discernible to the user as being different from the actual registered data regarding the bicycle, and which thus signalling anomalous operation of the sensor device 1, and which data pattern does not comprise the registered data regarding the bicycle 100. An output of the sensor device 1 with such a data pattern would also make it obvious to the user that the data displayed by the external device 50 is wrong or differs from what would have been shown during operation of the sensor device 1 in the first mode M1. For instance, when the sensor device 1 operates in the second mode M2, the external device 50 may display a suitable message, continuously or according to a pattern, to the user.

It is noted that operation of the sensor device 1 may initially start in any one of the first mode M1 or the second mode M2 when the sensor device 1 is first installed or put in use.

In the following a few examples of operation in the second mode M2 is given. Illustrations are shown on FIGS. 3 to 5. Other ways of operating the sensor device 1 in the second mode M2 are also feasible.

Figure 3:
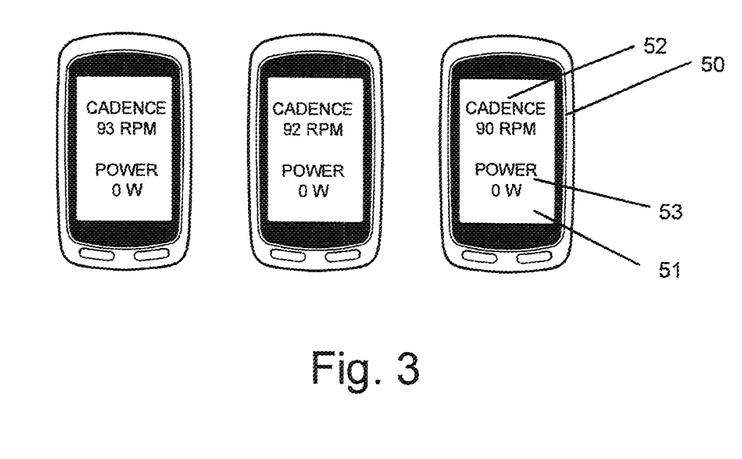
FIG. 3 shows a schematic illustration of a first example of a data pattern signaling anomalous operation of the sensor device and being used when operating a sensor device according to the invention in a second mode.

In a first example illustrated in FIG. 3 the output 5 of the sensor device 1 comprises values for two parameters 52, 53 such as for example cadence (RPM) 52 and power (Watts) 53 displayed to the user on the external device 50. In the second mode M2 the output 5 of the sensor device 1 is modified to comprise data with a data pattern according to which data related to the cadence 52 is displayed normally, but zero watts is continuously displayed for power 53. Alternatively another constant value, e.g. 999 or 888, for one or both of the parameters 52, 53 may continuously be show to the user.

Figure 4:
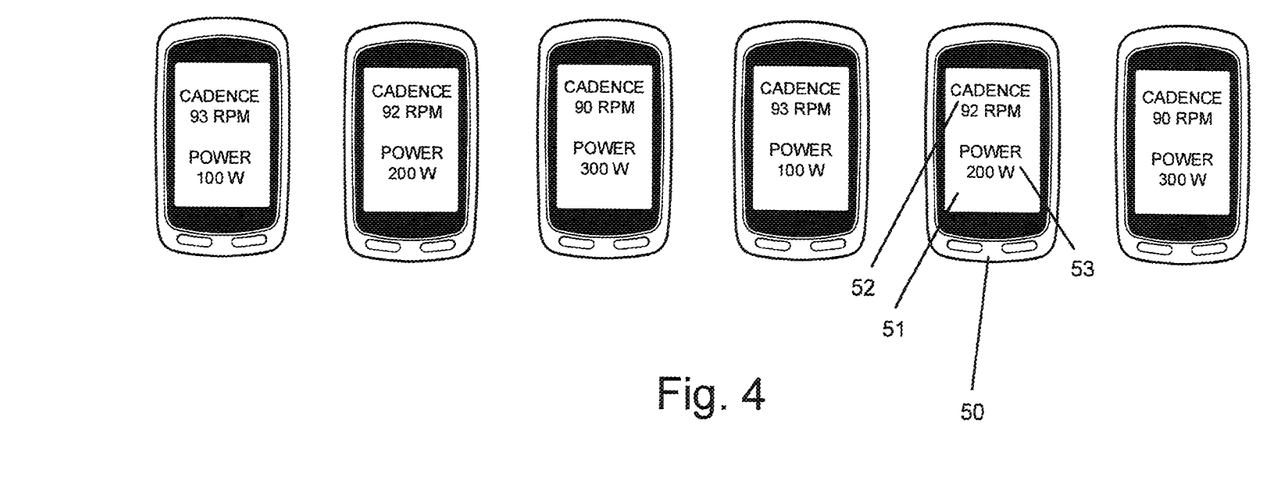
FIG. 4 shows a schematic illustration of a second example of a data pattern signaling anomalous operation of the sensor device and being used when operating a sensor device according to the invention in a second mode.

In a second and related example illustrated in FIG. 4, the output 5 of the sensor device 1 is modified to comprise data with a data pattern according to which for power 53 an output of 100 W is displayed for 5 seconds, an output of 200 W is displayed for 5 seconds, an output of 300 W is displayed for 5 seconds and then the pattern is started over. Other values of the power output may of course readily be chosen. Of course, the output 5 of the sensor device 1 may also, additionally or alternatively, be modified such that it comprises a similar pattern for cadence 52.

Figure 5:
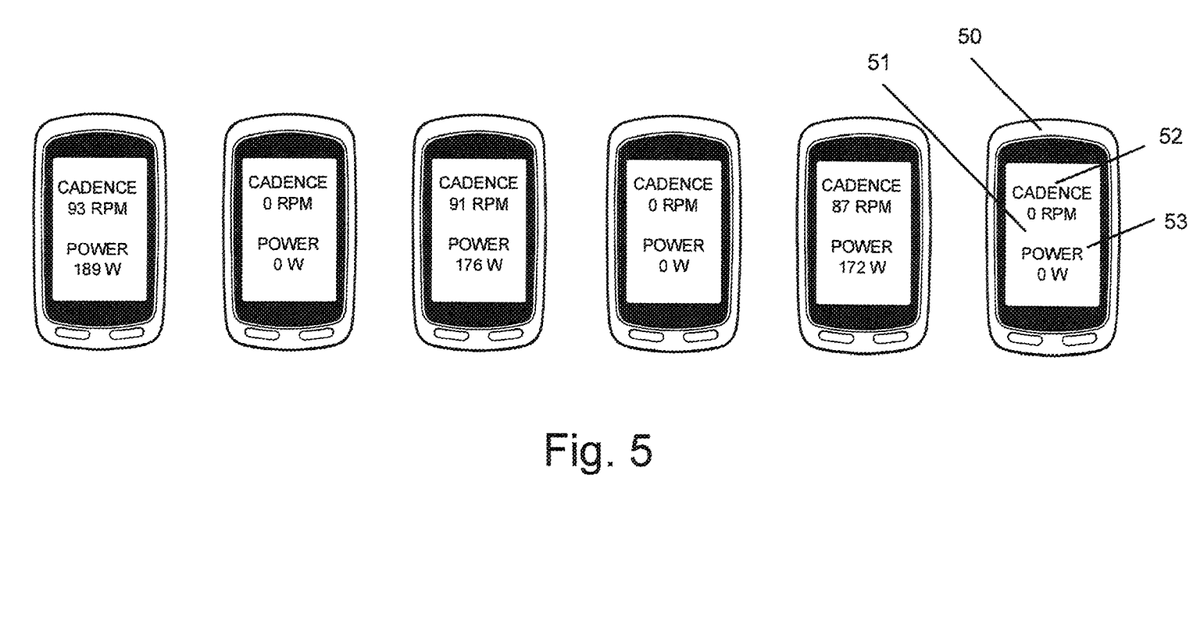
FIG. 5 shows a schematic illustration of a third example of a data pattern signaling anomalous operation of the sensor device and being used when operating a sensor device according to the invention in a second mode.

A third example is illustrated in FIG. 5 and is a data pattern according to which correct values are displayed for 5 seconds and null values are displayed for 5 seconds interleaved.

Figure 6:
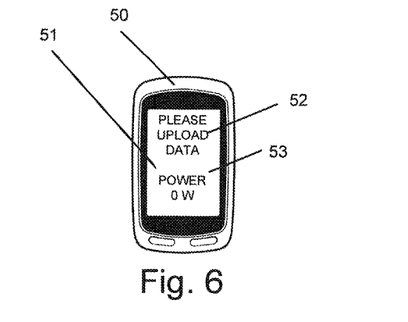
FIG. 6 shows a schematic illustration of a fourth example of a data pattern in the form of a suitable message signaling anomalous operation of the sensor device and being used when operating a sensor device according to the invention in a second mode.

In a fourth example, where the external device 50 is equipped with a display 51, the output 5 of the sensor device 1 comprises data in the form of a message may be shown to the user for 5 seconds every time the sensor device 1 is operated. Alternatively, and as illustrated in FIG. 6, a suitable message, such as "Please Upload Data" or "Time to Upload Data", may be shown continuously to the user. As shown in FIG. 6 the message takes the place of the parameter 52, but may also take the place of the other parameter 53 or of both parameters 52 and 53.

It is noted that even if the above examples of operation of the sensor device 1 in the second mode M2 are all based on visual indications, it is also feasible to provide the sensor device with an element for emitting an acoustic or a tactile signal and to employ such an acoustic or a tactile signal as an indication to the user of operation in the second mode M2.

In an example of a tactile signal or indication, the sensor device 1 is adapted for monitoring an active suspension of the bicycle 100, and the output 5 of the sensor device 1 is an output provided to the active suspension and comprising a data pattern according to which the active suspension is caused to operate with interleaved periods of 5 seconds of "firm" suspension and periods of 10 seconds of normal operation.

Turning again to FIG. 2, the third mode M3 is a data transfer mode in which data stored in the data storage unit 4 of the sensor device 1, such as the data regarding the bicycle, is transmitted or uploaded to the external device, and if required furthermore is uploaded to a remote server unit 60 (cf. FIG. 8) via the external device 50 or via a further external device 50' (cf. FIG. 9). When the sensor device 1 operates in the third mode M3, the sensor device 1 thus transfers data to the external device 50 or to the further external device 50'. The external device 50 or the further external device 50' receives the transferred data and is in one embodiment provided with an app 54 (cf. FIGS. 8 and 9, respectively) configured to interpret, analyze and display the data. Alternatively, the external device 50 or the further external device 50' receives the transferred data and provides an internet access such as to forward the received data via an Internet connection 70 (cf. again FIGS. 8 and 9, respectively) to a remote server unit 60. The remote server unit 60 is configured to interpret, analyze and display the data.

Figure 8:
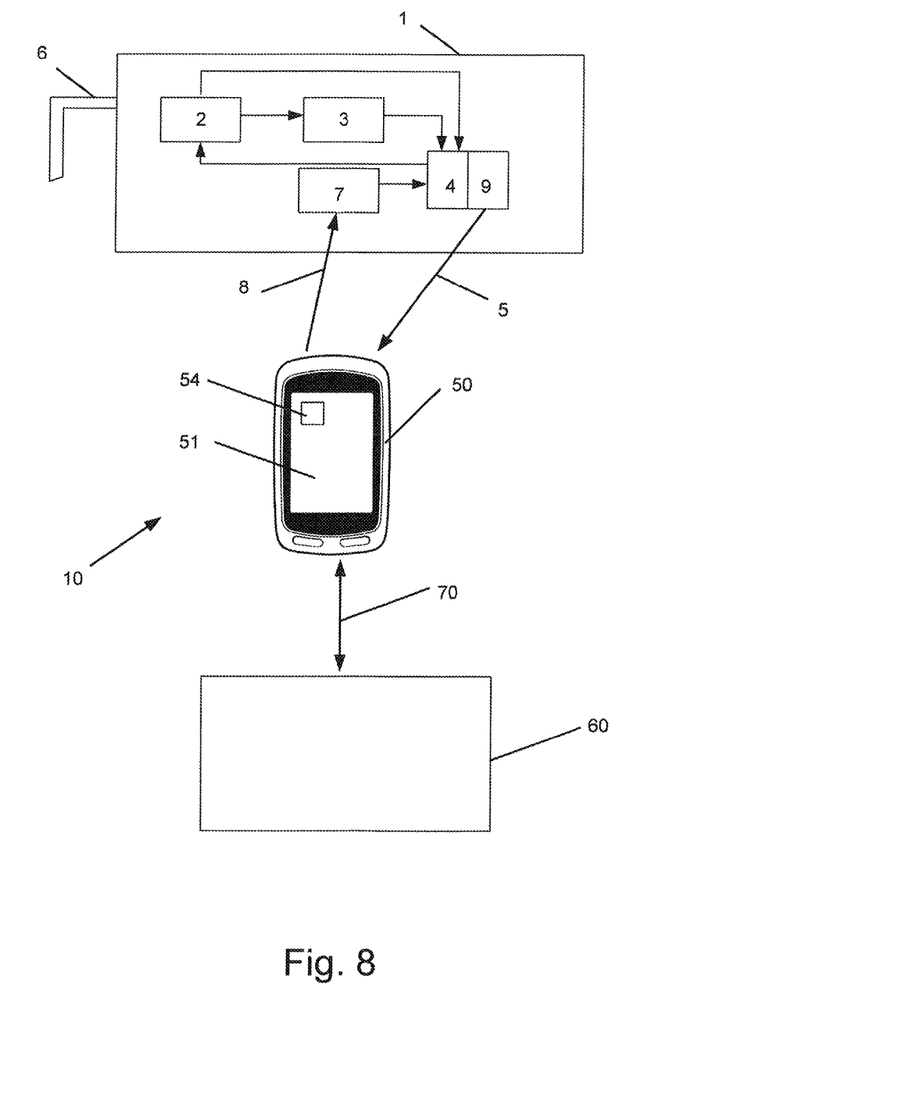
FIG. 8 shows a schematic illustration of a system according to a second aspect of the invention and comprising a sensor device according to the first aspect of the invention and an external device.

Whenever the external device 50 or the further external device 50' is connected to the sensor device 1 and to the internet, data from the sensor device 1 can be uploaded to a remote server 60 and be analyzed for potential safety hazards and/or wear of components. In case the external device 50 or the further external device 50' cannot establish access to the remote server unit 60, the data received from the sensor device 1 may be stored in a memory device or cache of the external device 50 or the further external device 50' and be uploaded to the remote server device 60 at a later time. If any critical conditions are detected, such as a component of the bicycle 100 needing maintenance or exchange, the user can be adequately warned. If the sensor data are deemed within safe ranges, a key or token may be transferred to the sensor device 1 to restart a period of normal operation, i.e. operation in the first mode M1. The period of normal operation may be a fixed period or a period determined based on the data analysis.

In an embodiment, the sensor device 1 works in the same three modes M1, M2, M3 as described above, but instead of restarting a limited period of normal operation when data has been transferred (in the third mode M3), a key or token may be transferred to the sensor device 1 to switch it to an infinite period of normal operation. This would be useful when only a single safety check is required to verify correct installation and initial operation.

In an embodiment the sensor device may work in the third mode M3 and either of the first mode M1 and the second mode M2 simultaneously. Thereby a faster data transfer is enabled, and it is furthermore made possible to execute the data transfer process as a background process.

Still with reference to FIG. 2 the operation of the sensor device 1 may also be explained by means of three transitions TA, TB and TC.

The processor element 4 of the sensor device 1 is configured to cause the sensor device 1 to perform a first transition TA from operating in the first mode M1 to operating in the second mode M2 in reaction to a predefined limit of a predefined value being reached.

Examples of predefined values are given above. Further examples of predefined value are usage time, number of rides, number of revolutions, magnitude of vibrations, magnitude of strain and magnitude of stress. Yet another example of a predefined value would be the capacity of the data storage unit 3.

Predefined values such as magnitude of vibrations are suitable for monitoring wear of bicycle parts such as, but not limited to, cranks, wheels and wheel rims. Predefined values such as usage time, number of rides and number of revolutions are suitable for monitoring wear of parts such as, but not limited to, tires and brakes. Predefined values such as magnitude of strain and stress are suitable for monitoring wear of bicycle parts such as, but not limited to, cables and frame components and chains.

The processor element 4 of the sensor device 1 is also configured to cause the sensor device 1 to perform a second transition TB from operating in the third mode M3 to operating in the first mode M1 in reaction to the data transfer process being finished or in other words the data storage unit 3 being empty or the data in the data storage unit 3 and the data in the external unit 50 and/or the further external unit 50' and/or the remote server unit 60 being synchronized.

In a further embodiment, the processor element 4 of the sensor device 1 may optionally also be configured to cause the sensor device 1 to perform a fourth transition from operating in the first mode M1 to operating in the third mode M3. Such an embodiment has the advantage of extending the time until it is needed for the sensor device 1 to operate in the second mode M2.

In some embodiments the sensor device 1 as described above with reference to FIG. 1 further comprises a receiver element 7 adapted for receiving an input 8 from the external device 50. Then, the processor element 4 of the sensor device 1 may be configured to cause the sensor device 1 to perform a third transition TC from operating in the second mode M2 to operating in the third mode M3 in reaction to the input 8 received indicating that an internet connection 70 (cf. FIG. 8) is established via the external device 50 or the further external device 50'. The processor element 4 of the sensor device 1 may also be configured to cause the sensor device 1 to perform a second transition TB from operating in the third mode M3 to operating in the first mode M1 in reaction to the input 8 received by the input device 7 indicating that the data transfer is completed and/or in reaction to the input 8 received by the input device 7 comprising a key or token configured to cause the sensor device 1 to switch to the first mode M1 for a defined or an infinite period of time. The input 8 comprising a key or token may be generated by and transmitted from any of the external device 50, the further external device 50' and the remote server unit 60, in the latter case optionally with intermediate storage of the input 8 in the external device 50 or the further external device 50'.

Turning now to FIG. 8, a system 10 according to a second aspect of the invention is shown. The system 10 comprises an external device 50 and a sensor device 1 according to the first aspect of the invention. The system may be or is furthermore connected via the internet to a remote server unit 60. The server unit 60 may optionally also be a part of the system 10.

The sensor device 1 comprises a sensor element 2, a processor element 4 and a transmitter element 9. The processor element 4 is configured to generate an output 5 of the sensor device 1 The transmitter element 9 is adapted for transmitting the output 5 of the sensor device 1 to the external device 50. The processor element 4 of the sensor device 1 is configured to cause the sensor device 1 to transmit the output 5 to the external device 50 in one of a first mode M1, a second mode M2 and a third mode M3 as described above.

The external device 50 is configured to and adapted for receiving the transmitted output 5. The external device 50 is configured to and adapted for displaying the received output 5 of the sensor device 1 to a user and comprises to this end a display 51. The external device 50 is configured to and adapted for providing internet access, in particular internet connection 70 to the remote server unit 60. The external device 50 may furthermore comprise an app 54 or another suitable program configured to process the received output 5 for analysis and/or display.

Turning now to FIG. 9 another embodiment of a system 10' according to a second aspect of the invention is shown. The system 10' differs from the system 10 shown in FIG. 8 in that the external device 50 is not equipped for providing internet access and in that it comprises a further external device 50' adapted for providing the internet connection 70.

Thus, the external device 50 is configured to and adapted for receiving the transmitted output 5. The external device 50 is configured to and adapted for displaying the received output 5 of the sensor device 1 to a user and comprises to this end a display 51.

The further external device 50' is configured to and adapted for receiving the transmitted output 5. The further external device 50' is configured to and adapted for displaying the received output 5 of the sensor device 1 to a user and comprises to this end a display 51'. The further external device 50' is configured to and adapted for providing internet access, in particular internet connection 70, to the remote server unit 60. The further external device 50' may furthermore comprise an app 54' or another suitable program configured to process the received output 5 for analysis and/or display. When the sensor device 1 comprises a receiver 7, the further external device 50' may furthermore be configured to transmit an input 8 to the receiver 7 of the sensor device 1.

When the sensor device 1 comprises a receiver 7, the remote server unit 60 may also furthermore be configured to transmit an input 8 to the receiver 7 of the sensor device 1, optionally via the external device 50 or the further external device 50'.

The person skilled in the art realizes that the present invention by no means is limited to the preferred embodiments described above. On the contrary, many modifications and variations are possible within the scope of the appended claims.

What is claimed is:

1. A sensor device without internee accessibility and mounted on or built into a component of a bicycle, the sensor device comprising:
    at least one sensor configured to register data regarding the bicycle,
    a data storage configured to store data regarding the bicycle registered by the at least one sensor,
    a processor configured to generate an output of the sensor device, and
    a transmitter configured to transmit by short range communication the output of the sensor device to a first external device configured to display the output of the sensor device to a user, wherein
    the processor is configured to cause the transmitter to transmit the output of the sensor device to the first external device in one of: a first mode, a second mode, a third mode, the first mode and the third mode simultaneously, or the second mode and the third mode simultaneously, and wherein:
    the first mode is a normal operation mode in which the output of the sensor device generated by the processor is the data regarding the bicycle registered by the at least one sensor,
    the second mode is a service request mode in which the output of the sensor device generated by the processor comprises data different from the data regarding the bicycle registered by the at least one sensor which, when displayed by the first external device, signals anomalous operation of the sensor device, and the third mode is a data transfer mode in which data stored in the data storage of the sensor device is transferred to the first external device or to a second external device.

2. The sensor device according to claim 1, wherein the processor further is configured to cause the transmitter to switch from transmitting the output of the sensor device to the first external device or the second external device in the second mode to transmitting the output of the sensor device to the first external device in the first mode via the third mode.

3. The sensor device according to claim 2, wherein the processor is further configured to perform a transition from causing the transmitter to transmit the output of the sensor device in the first mode to causing the transmitter to transmit the output of the sensor device in the second mode in response to reaching a predefined limit of a predefined value.

4. The sensor device according to claim 3, wherein the predefined value comprises one or more of: a usage time, a number of rides, a number of revolutions, a magnitude of vibrations, a magnitude of strain, and a magnitude of stress.

5. The sensor device according to claim 1, wherein the output of the sensor device in the second mode comprises a data pattern based on the data regarding the bicycle registered by the at least one sensor, wherein the data pattern, when displayed by the first external device, signals the anomalous operation of the sensor device.

6. The sensor device according to claim 5, wherein, for signalling anomalous operation of the sensor device, a data pattern of the sensor device comprises one or more of:
   alternating a first mode output of the sensor device for a first predetermined duration and a non-first mode output of the sensor device for a second predetermined duration,
   a first mode output of the sensor device displayed to the user as a first parameter and a non-first mode output of the sensor device displayed to the user as a second parameter,
   alternating different values of the first parameter displayed to the user, and
   a constant value of the first parameter displayed continuously to the user.

7. The sensor device according to claim 1, wherein the sensor device further comprises a receiver configured to receive an input from the first external device or from the second external device, and wherein
   the processor is configured to perform a transition from causing the transmitter to transmit the output of the sensor device in the second mode to causing the transmitter to transmit the output of the sensor device in the third mode based on the input received, wherein the input indicates that a connection is established between the first external device and the internet or between the second external device and the internet, or wherein the input indicates a request for data transfer from the first external device or the second external device.

8. The sensor device according to claim 1, wherein the processor is configured to perform a transition from causing the transmitter to transmit the output of the sensor device in the third mode to causing the transmitter to transmit the output of the sensor device in the first mode based on the data storage being empty.

9. The sensor device according to claim 1, wherein the data stored in the data storage of the sensor device comprises the data regarding the bicycle registered by the at least one sensor.

10. The sensor device according to claim 1, wherein the third mode is a data transfer mode in which data stored in the data storage of the sensor device is further uploaded to a remote server via the first external device or the second external device.

11. The sensor device according to claim 1, wherein:
   the sensor device further comprises a receiver configured to receive an input from one or more of: the first external device, the second external device, or a remote server; and
   the processor is configured to perform a transition from causing the transmitter to transmit the output of the sensor device in the third mode to causing the transmitter to transmit the output of the sensor device in the first mode, the transition based on one or more of:
      the input received indicating that the data transfer is completed,
      the input received indicating that the data in the data storage and the data in the first external device or in the second external device or in the remote server is synchronized, or
      the input received comprising a key or token configured to cause the processor to switch to the first mode for any one of a defined and an infinite period of time.

12. A system comprising:
   a sensor device without internet accessibility and mounted on or built into a component of a bicycle, the sensor device comprising:
      at least one sensor configured to register data regarding the bicycle;
      a data storage configured to store data regarding the bicycle registered by the at least one sensor;
      a transmitter configured to transmit by short range communication the output of the sensor device; and
      a processor configured to generate an output of the sensor device and to cause the transmitter to transmit the output of the sensor device in one of: a first mode, a second mode, a third mode, the first mode and the third mode simultaneously, or the second mode and the third mode simultaneously; and
   a first external device configured to receive the transmitted output of the sensor device, display the received output of the sensor device to a user, and provide a connection to the internet; wherein:
      the first mode is a normal operation mode in which the output of the sensor device generated by the processor is the data regarding the bicycle registered by the at least one sensor,
      the second mode is a service request mode in which the output of the sensor device generated by the processor comprises data different from the registered data regarding the bicycle which, when displayed by the first external device, signals anomalous operation of the sensor device, and
      the third mode is a data transfer mode in which data stored in the data storage of the sensor device is transferred to the first external device or to a second external device.

13. The system according to claim 12, further comprising the second external device; wherein:
   the first external device is configured to receive the transmitted output of the sensor device and display the received output of the sensor device to the user,
   the third mode is a data transfer mode in which data stored in the data storage of the sensor device is transferred to the second external device, and the second external device is configured to receive the transmitted output of the sensor device, display the received output of the sensor device to the user, and provide the connection to the internet.

14. The system according to claim 13, wherein the second external device is further configured to, when the processor is causing the transmitter to transmit the output of the sensor device to the second external device in the third mode, upload the received output of the sensor device to a remote server via the connection to the internet.

15. The system according to claim 12, wherein the first external device or the second external device or a remote server is further configured to transmit an input to the sensor device, and the sensor device further comprises a receiver configured to receive the input from one or more of: the first external device, the second external device, or the remote server.

16. The system according to claim 12, wherein the data stored in the data storage of the sensor device comprises the data regarding the bicycle registered by the at least one sensor.

17. The system according to claim 12, wherein the first external device is further configured to, when the processor is causing the transmitter to transmit the output of the sensor device to the first external device in the third mode, upload the received output of the sensor device to a remote server via the connection to the internet.

18. The sensor device according to claim 6, wherein, for signalling anomalous operation of the sensor device, the non-first mode output of the sensor device is a null value output.

* * * * *